March 12, 1968

J. A. BODHAINE 3,372,705

BALL SEALER INJECTOR

Filed Dec. 13, 1966

INVENTOR.
JAMES A. BODHAINE
BY
MARCUS L. BATES

March 12, 1968

J. A. BODHAINE 3,372,705

BALL SEALER INJECTOR

Filed Dec. 13, 1966

INVENTOR.
JAMES A. BODHAINE
BY
MARCUS L. BATES

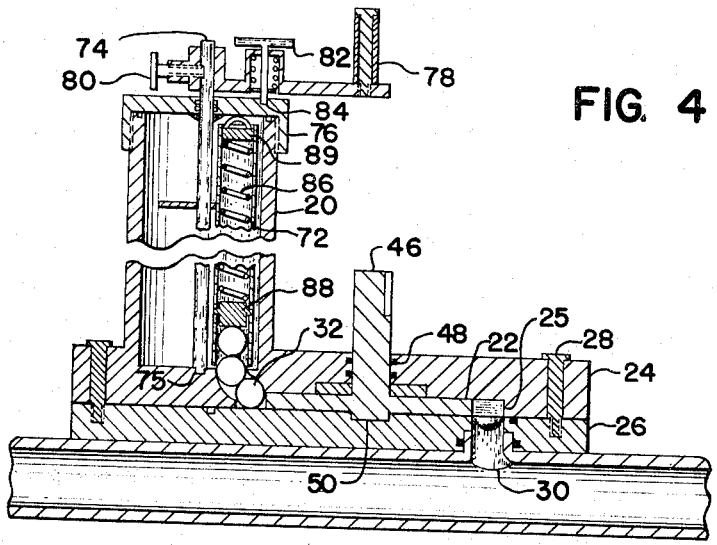
FIG. 4
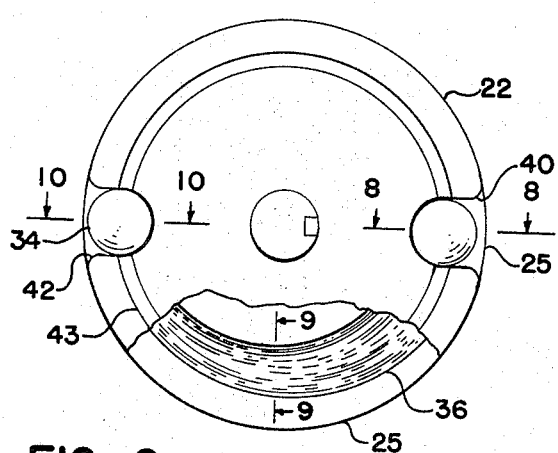
FIG. 6
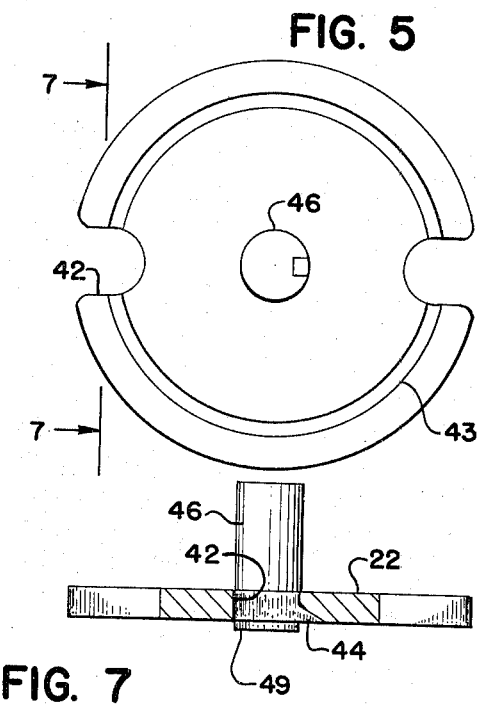
FIG. 5
FIG. 7
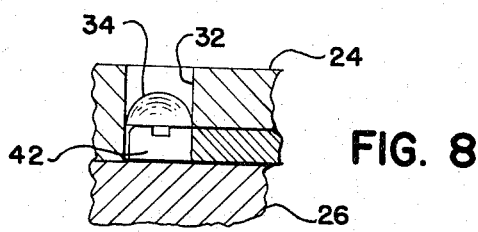
FIG. 8
INVENTOR.
JAMES A. BODHAINE
BY
MARCUS L. BATES

United States Patent Office 3,372,705
Patented Mar. 12, 1968

3,372,705
BALL SEALER INJECTOR
James A. Bodhaine, 1521 Pecos, Hobbs, N. Mex. 88240
Filed Dec. 13, 1966, Ser. No. 601,461
12 Claims. (Cl. 137—268)

ABSTRACT OF THE DISCLOSURE

A ball sealing device having a reservoir containing a multiplicity of balls located in individual tubes above a main body that houses a rotating plate. The main body includes a ball inlet, a ball outlet, and a toroidal passageway that extends 180° and cooperates with the circular plate to positively feed balls from the inlet, through the toroidal passageway located in the body, to the outlet, and into a pipe line to thereby meter balls from the reservoir into the pipe line, where the balls then flow along inside the pipe line and into a casing located in a bore hole to thereby close off perforations located in the wall of the casing.

Background of the invention

This invention particularly relates to apparatus used in the chemical treatment of wells, and more particularly to a device that is used in conjunction with the procedure generally referred to as "acidizing." In acidizing a bore hole, such as an oil well, one or more trucks having enormously high pressure pumping units force various chemicals, including acid, into the bore hole for the purpose of enlarging passageways through which oil from the formation is produced. The formation, or production zone, is located radially about the bore hole, and oil generally flows into the well casing by means of perforations that have previously been placed in the wall of the casing, usually by means of jet perforators or the like. These holes are generally less than one inch in diameter and connect the interior of the casing with the producing formation. From time to time, it has been found advantageous to treat the well by pumping acid under tremendous pressure into the oil producing formation, thereby requiring the chemical to be forced through the perforated casing and into the formation.

Some of the perforations that communicate with the producing formation are located in a zone which flows freely; however, other perforations connect with part of the formation where little or no flow occurs. Therefore, it is desirable to treat each part of the entire formation an equal amount, so as to enhance the flow of the entire zone. However, when acid is pumped through the perforations and into the formation, the part of the formation that is already freely flowing provides the least resistance to the flow of the chemical and accordingly, most of the acid is used in treating a portion of the formation that actually is already producing satisfactorily, and therefore requires no further treatment. Hence, it is desirable to close off each perforation after it has received its proportionate share of the chemical used to acidize the well, so as to include the zone having unsatisfactory communication with the casing in the treatment, to thereby improve the flow.

Description of the prior art

It is old, in acidizing wells, to pump balls having a diameter slightly greater than the diameter of the perforations in the casing, into an oil well during the chemical treatment or acidizing of the well. Heretofore, the equipment used to place the balls into the acid flowline has proven inadequate for the reason that the devices of the prior art fail to positively place a predetermined number of balls within the acid flowline and within an evenly spaced predetermined time interval so as to assure closing off each perforation as its associate zone receives a proportionate amount of treatment. Furthermore, a positive acting ball sealer injector that counts the number of balls that have positively been placed into the bore hole has heretofore been unknown.

Summary

It is therefore an object of the present invention to provide a ball sealer injector device that positively meters balls into a bore hole within a given interval of time.

Another object of this invention is to provide a ball sealer injector device that positively counts each ball as it is injected into the bore hole.

Another object of this invention is to provide a ball sealer injector device having a novel reservoir for containing the balls, and a novel rotatable disk that cooperates with a toroidal inclined passageway to thereby positively transfer the balls from the reservoir into the pipe line that is connected to the well.

Still another object of this invention is to provide a ball sealer injector device that is simple in design, efficient in operation, and safe when used in conjunction with high pressure wells.

The above objects are attained in accordance with the present invention by the provision of a ball sealer injector device that includes a main body having a flow line incorporated therewith, and a ball containing reservoir depending from the main body that is adapted to provide a continuous supply of balls to a ball inlet. A sloped toroidal passageway 180° in circumference communicates the ball inlet with the flow line, and a ball metering device comprised of a circular disk having an outer peripheral edge defined by the diameter of the passageway cooperates with the toroidal passageway to thereby transfer the balls from the reservoir into the flowline by means of cut-outs located in the disk. The balls are metered into the flowline in direct proportion to the speed of the rotating disk, and a counter mechanism associated with the disk and balls positively count each ball as it passes through the passageway. Accordingly, when chemically treating an oil well, or the like, the balls may advantageously be metered into the well so as to permit the balls to flow along with the chemical to thereby close off each of the perforations in the wall of a well casing to thereby progressively force chemical into each individual remaining perforation until all of the perforations are closed off by the balls.

Brief description of the drawings

FIGURE 4 is a longitudinal cross-sectional view of the device seen in FIGURES 1 and 2, but reduced in size and with some parts being cut away to conserve drawing space;

FIGURE 5 is a top plan view of part of the device seen in FIGURE 4;

FIGURE 6 is a fragmentary view of part of the device as seen in FIGURE 4, with some parts being removed to better illustrate the details of the invention;

FIGURE 7 is a cross-sectional view taken along line 7—7 of FIGURE 5, with some parts shown in section, and other parts included so as to better illustrate the device;

FIGURE 8 is a cross-sectional fragmentary view taken along line 8—8 of FIGURE 6, with the ball 34 removed;

*Detailed description*

Figure 1:
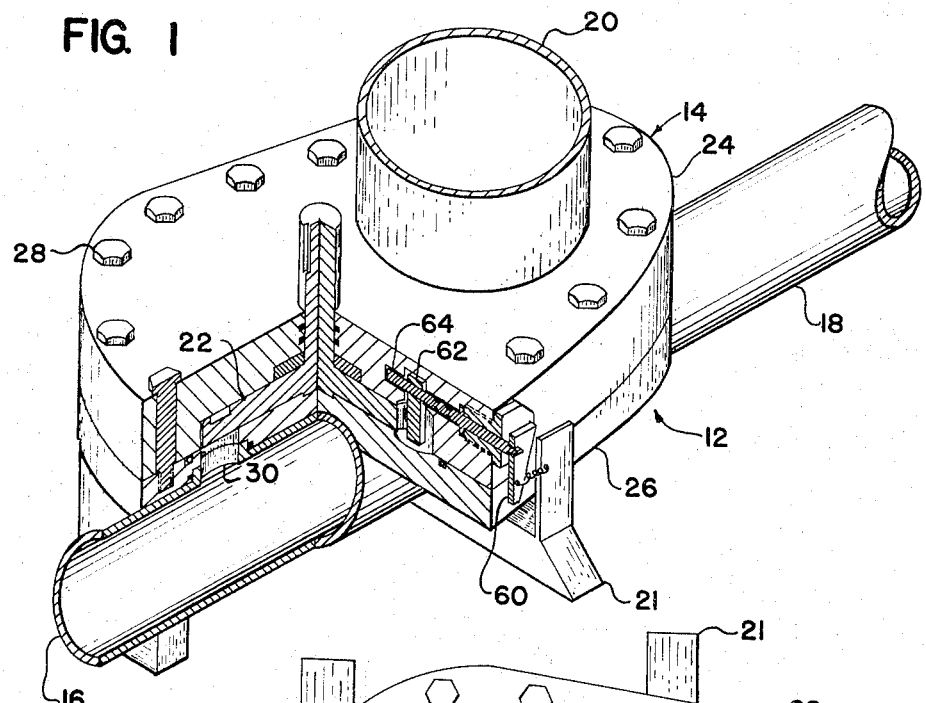
FIGURE 1 is a perspective view of the ball sealer device, with some parts cut away and other parts shown in section in order to better illustrate the details of the invention.
Figure 2:
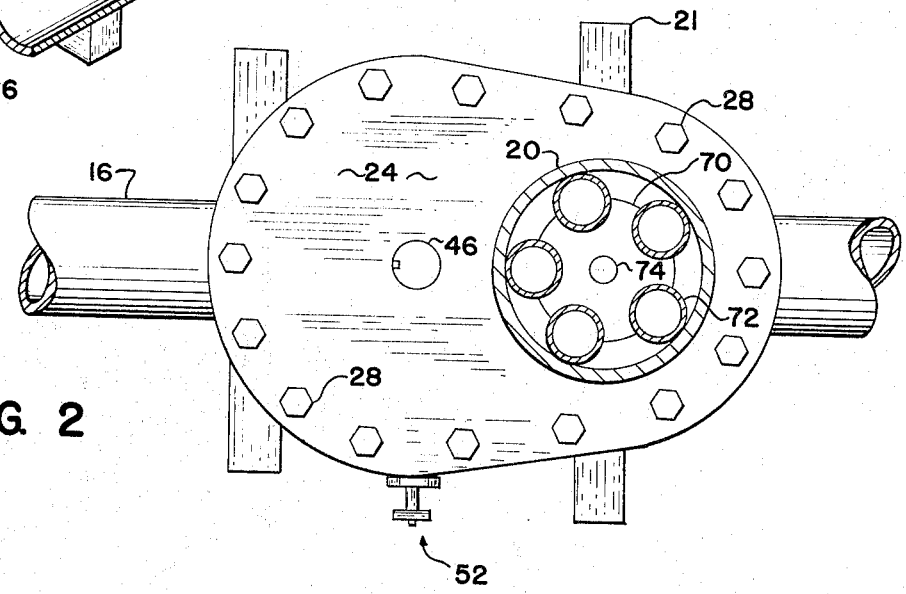
FIGURE 2 is a top plan view of the device seen in FIGURE 1, with some parts cut away and shown in section.
Figure 9:
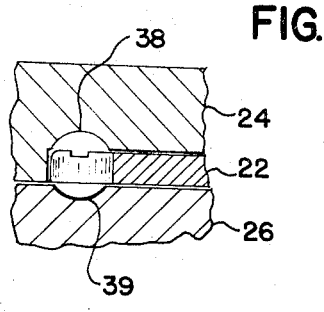
FIGURE 9 is a cross-sectional fragmentary view taken along line 9—9 of FIGURE 6.
Figure 10:
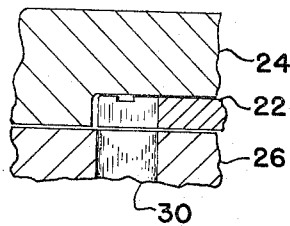
FIGURE 10 is a cross-sectional fragmentary view taken along line 10—10 of FIGURE 6, with the ball 34 removed.
Figure 3:
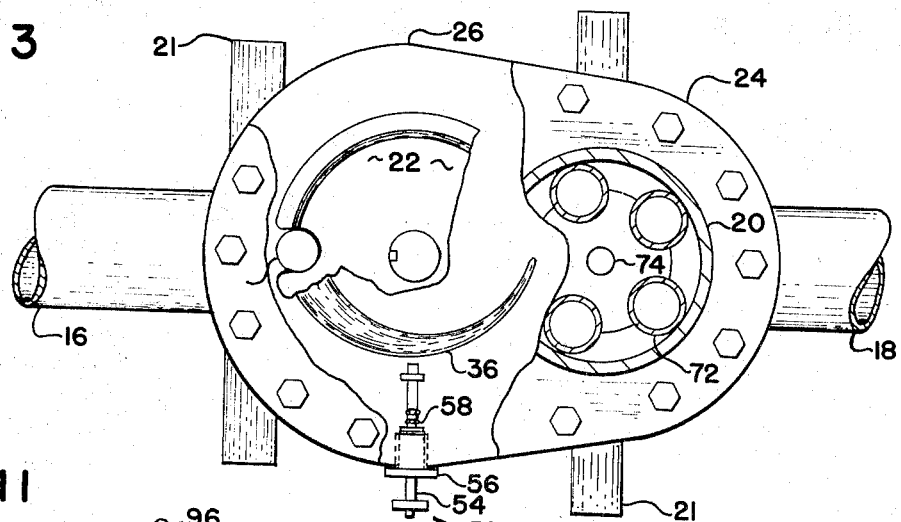
FIGURE 3 is a top plan view, in some respects similar to FIGURE 2, with some parts shown in section, and other parts being removed so as to better illustrate the details of the invention.

Looking now to the details of the drawings, wherein there is disclosed a ball sealing injector device, indicated generally by the arrow at numeral 12, that includes a main body 14, an outlet 16, and an inlet 18. Vertically upstanding from the main body 14, there is seen a container 20 that forms a reservoir for a multiplicity of balls. A frame 21 suitably supports the device upon any satisfactory surface, such as the ground.

A rotating plate 22 is suitably housed in close fitting tolerance between an upper housing member 24 that contains a plate receiving depression 25, and a lower housing member 26, with each member being rigidly mated together by means of a multiplicity of bolts 28 located about the outer marginal edge of the main body. The outlet 16 is provided with a ball outlet or exit aperture 30 that communicates with a ball inlet passageway 32, with each passageway being slightly larger in diameter than a ball 34 so as to accommodate the ball as it freely passes therethrough. Passageways 30 and 32 are interconnected by a toroidal passageway 36 that is also slightly greater in diameter than the ball 34 so as to allow unobstructed passage of the ball therethrough.

The toroidal passageway 36 joins the ball inlet 32 with the ball outlet 30 and is approximately 180° in circumferential length. It should be understood that the toroidal passageway could be made other circumferential lengths and still fall within the comprehension of this invention. The outer marginal edge of the inside peripheral surface of the toroidal passageway is essentially defined by the outer marginal edge of the rotating plate 22. The toroidal passageway generally slopes from the ball inlet 32 to the ball outlet 30, an amount exactly equal to the thickness of the plate 22, which in turn is approximately one half of the diameter of the largest ball that can be satisfactorily used in conjunction with the specific illustrated device.

Looking now to the details of FIGURE 4, in conjunction with the remaining figures, the operative relationship of the rotating plate 22, with respect to the toroidal passageway and the ball reservoir, is clearly illustrated. As seen in FIGURE 4, the ball inlet side 32 of the toroidal passageway is formed in the upper housing member 24. As the toroidal passageway progresses along a circumferential path through the main body into proximity of the ball outlet 30, it should be apparent that the toroidal passageway is formed at the interface between the upper and lower housing members 24 and 26 with each surface of the upper and lower housing members being milled an amount whereby the cross sectional area taken at right angles to the toroidal passageway is always slightly greater in diameter than one of the balls that is to pass through the passageway. The upper portion 38 of the toroidal passageway is formed in the upper housing member 24 and the lower part of the passageway 39 is formed in the lower housing member 26, with the upper portion of the passageway diminishing in area with respect to the lower housing member while the lower portion of the passageway increases in area with respect to the upper housing member as the passageway progresses circumferentially from the ball inlet to the ball outlet. These details are best understood by viewing FIGURES 6 and 8 through 10.

The plate 22 is provided with oppositely opposed cut-outs 40 and 42 that are contoured in the illustrated manner so as to suitably receive a ball 34 therein. The plate is further provided with a circumferential groove 43 near the marginal edge portion that provides the guide means for the counter mechanism, the details of which will be more fully explained later on. Numeral 44 illustrates the manner in which the cut-outs 40 and 42 may be sloped or inclined to facilitate expelling a ball as the cut-out 40 or 42 passes over the ball exit 30. The plate 22 is rotatably driven by the plate shaft 46 by any suitable means, including manual drive means and electrically operated motor drive means. The shaft 46 is suitably fitted in the illustrated manner with respect to the upper and lower housing members 24 and 26, and O-rings 48 are provided in the indicated manner to thereby maintain a positive seal between the shaft 46 and the main body 14. The shaft 46 includes a downwardly depending protuberance 49 that is suitably fitted into a counterbore 50 so as to maintain the rotating plate and shaft in properly aligned low friction relationship with the remainder of the apparatus, and may additionally include bearings, where such an expedient is deemed desirable. It is considered within the scope of this invention to use a plate member 22 having other numbers and arrangement of slots or cut-outs therein.

A counting mechanism, generally indicated by the arrow at numeral 52, is provided in the side of the device, and includes a counter shaft 54 having a packing nut 56 and a multiplicity of O-ring seals 58 that suitably seals the counting mechanism from the remainder of the device. A spring loaded lever 60 is provided at one of the free ends of the counter shaft that is adapted to actuate a counter recorder (not shown). A ball feeler finger 62 is rigidly attached near the opposite or inwardly directed end of the shaft and depends from above the toroidal passageway with the shaft maintained clear of the ball where the free end of the finger is biased to the illustrated position where it rides in the before mentioned groove 43 of the rotating plate member 22. Each ball that engages the feeler finger causes the feeler finger to actuate the counter shaft 54, thereby imparting a limited rotational movement thereto that in turn actuates lever 60 to thereby enable recordation of the movement by a suitable recorder each time the lever 60 is rotatably actuated. The end of shaft 54 is suitably mounted in low friction means within a counter bore 64.

Looking now to the details of the ball reservoir, there is seen an upstanding cylinder 20 that forms the outer wall of the cylindrical reservoir. The cylinder houses a multiplicity of tubes 72 that are suitably mounted in a radially disposed manner about a shaft 74. A closure member 76 threadedly engages the top of the cylinder 20 and sealingly receives the before mentioned shaft 74 therethrough to provide a high pressure closure means for the upstanding cylinder 20. A handle 78 is removably and rigidly attached to the before mentioned shaft 74 and includes locking means 80 that provides a quick release for the entire handle assembly. Spring loaded indexing means 82 cooperate with one of a multiplicity of detents 84 that are suitably spaced about the marginal edge portion of the cap so as to selectively index each of the before mentioned tubes 72 with the ball inlet 32 of the main body. Each of the detents 84 are suitably aligned on the closure member so as to enable rotation of shaft 74 the precise angle of rotation whereby each of the tubes 72 may be selectively aligned with respect to the ball inlet 32. Within each vertical tube 72 there is provided a spring 86 having a plunger 88 at the lower extremity thereof and a locking device 89 at the upper extremity thereof that cooperates with the upstanding free end of the tube 72 to thereby maintain all of the aligned balls within each of the tubes spring biased in a downward direction.

Figure 11:
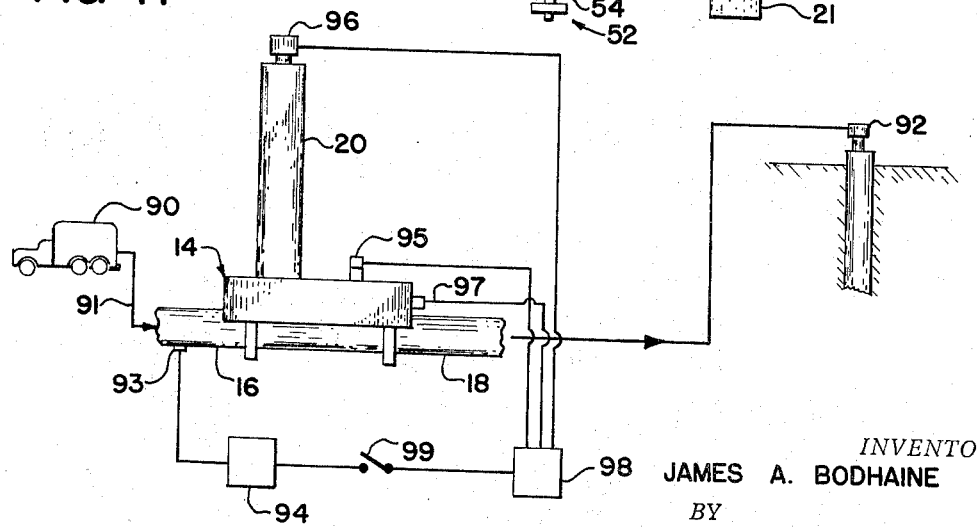
FIGURE 11 is a partly schematical representation, showing the operative relationship of the invention with respect to an oil well undergoing treatment.

Looking now to the details of the embodiment of FIGURE 11, there is seen illustrated therein a schematical representation of one of the methods by which the present invention may be carried into practice. A chemical truck 90 that is provided with high pressure pumps is suitably connected by means of a pump flowline or conduit 91 to the inlet 18 of the ball sealer injector device. An oil well Christmas tree, generally illustrated by the numeral at 92, is suitably connected to the outlet of the ball sealer injector device. Element 93 indicates a suitable flow measuring apparatus that is connected to the outlet from the truck and senses the flow rate through the flowline. The analyzer 94 visually indicates the flow rate of the treatment chemical that is being pumped by the truck 90 through the flowline of the ball sealer device and into the well at 92, and also sends an impulse in proportion to the magnitude of the flow rate. A motor drive 95 is suitably connected to the shaft 46 so as to drive the plate 22 with a selectively controlled rotational velocity. A motor drive 96 is suitably connected to the drive shaft 74 in a manner that selectively places each tube 72 in indexed relationship to the ball inlet 32. A counter (not shown) is suitably placed adjacent lever 60 so as to be actuated each time a ball passes through the toroidal passageway. The counter is electrically connected by conduit 97 to the electronic device 98. A switch 99 is adapted to interconnect the before-mentioned flow rate calculator to the electronic device 98 so as to selectively enable either automatic or semi-automatic operation of the device.

*Operation*

Looking first to the manual operation of the device illustrated in FIGURES 1 through 10, the ball sealer injector is suitably connected with the outlet 16 being attached to an oil well and the inlet 18 attached to an acidizing truck, or other treatment means. The entire handle assembly 78 is removed by loosening the friction lock 80, so as to enable removal of the closure means 76. Each of the spring loaded plungers 88 are removed by unfastening the locking means 89 and withdrawing the fastening means along with the spring 86 and the plunger 88. Sealing balls of a predetermined size are placed within the upstanding tube 72, leaving sufficient room at the upper extremity of the tube 72 to allow replacement of the spring loaded plunger 88 along with its spring 86 and locking means 89. After each of the upstanding tubes 72 are loaded in this manner, the cap 76 is secured in the illustrated sealed position and the handle assembly 78 rigidly attached to the shaft 74 and the indexing device 82 placed in one of the detents 84 by rotating the shaft 74 until this condition is visually observed to have occurred. The shaft 46 is rotated by any suitable means (such as a reduction gear drive, not shown) until the counter 52 indicated that a ball has been placed into the flowline through the ball exit aperture. Each 180° revolution of the plate member 22 transfers a ball from the ball inlet into one of the cut-outs 40 or 42 of the plate member 22 whereupon the ball is conveyed by means of the cut-out from the ball inlet 32 through the toroidal passageway 36 and into the ball outlet or exit aperture 30. It is impossible for a ball to continue the remainder of the 360° path since the toroidal passageway is only 180° in length. The ball will not jam at the ball exit aperture 30 since the plate member is suitably curved or sloped as previously indicated at 44. Each 180° rotation of the plate member 22 will positively place a ball into the flowline and this action will be recorded by the counter 52 since the passage of the ball through the toroidal passageway will activate the rotatable shaft 54 a limited amount thus moving lever 60 an equal amount to thereby actuate a counting device.

As each tube 72 is exhausted of balls, the indexing device 82 is lifted from the detent 84 and the handle 78 rotatably moved so as to permit the indexing device 82 to fall into the next adjacent detent 84 to thereby place the next adjacent upstanding tube 72 properly superimposed above the ball inlet 32. As the balls from each upstanding tube 72 is consumed by the device, the spring loaded plunger 88 follows the last ball downwardly to thereby positively feed all of the balls into the ball inlet 32. The plunger is of a size and configuration to preclude any interference with the action of the rotating plate mechanism.

The balls may be fed into the flowline by observing the elapsed time between the balls and rotating the shaft at a speed that will place the balls apart a predetermined amount to insure the proper ratio between the balls and the quantity of chemical that has been pumped into the well.

Alternatively, the operation of the device may be fully automatic or semi-automatic in accordance wtih FIGURE 11. For semi-automatic operation of the ball injector device, the switch at 99 remains open and the handle mechanism 78 and the shaft 46 of the ball ejector device is replaced with motor driven devices that duplicates the previously detailed manual operation. The motor 96 drives the shaft 74 in an indexed manner and is controlled by the electronic device 98. The motor 95 that drives the shaft 46 of the rotating plate 22 is also controlled by the electronic device 98. The counting device that is actuated by the lever 60 is recorded by the electronic device 98. The flow rate device 93 may be visually observed at the recorder 94 so as to enable the operator to actuate the electronic device 98 in accordance with the flow indicated by the recorder 94 to thereby obtain the proper ratio of balls to the quantity of chemical that is being pumped into the well. The details of the flow rate means 93, recorder 94, motor drives 95 and 96, and the electronic device 98 are within the comprehension of those skilled in the art, and therefore the details of these elements used in conjunction with this embodiment of the invention are not included herein.

For full automatic operation of the ball sealer device, the switch 99 is closed whereupon the flow rate recorder 94 will now actuate the electronic device 98 that in turn will cause rotation of the shaft 46 by the drive means 95 in accordance with the rate of flow of chemical through the flowline.

The foregoing is considered as illustrative only of the principles of my invention. Numerous modifications and changes will readily occur to those skilled in the art, therefore it is not desired to limit the invention to the exact construction and operation shown and described, and accordingly all suitable modifications and equivalents that may be resorted to and that fall within the scope of the following claims is deemed to be my intellectual property.

I claim:

1. In a ball sealer injector device for positively metering balls into a well, a flowline having an inlet adapted to be connected to a source of flow and an outlet adapted to be connected to a well, the improvement comprising:

a main body having a passageway, a ball inlet, and a ball outlet, with said passageway interconnecting said ball inlet to said ball outlet;

a ball containing reservoir having means for aligning a multiplicity of balls with said ball inlet and including means for urging said balls into said ball inlet;

means for transferring balls from said ball inlet, through said passageway, to said ball outlet, and into the flowline;

said means for transferring balls include a rotatable member having means forming cut-outs therein for receiving a ball from said ball inlet;

said passageway being of a toroidal configuration and having a radius of curvature essentially described by said cut-out in said rotatable member, with said toroidal passageway being coextensive with said rotatable member for a limited distance, with the length of said toroidal passageway being determined by the distance between said inlet and outlet.

2. The combination of claim 1 wherein said ball containing reservoir includes a depending container having a multiplicity of longitudinally arranged tubes radially spaced about a rotatable means with each tube being attached to said rotatable means to thereby be selectively superimposed along a circumferenital path with said circumferential path passing along said ball inlet to thereby allow said tubes to be selectively superimposed above and in alignment with said ball inlet, whereby; said tubes may be selectively aligned with said ball inlet to thereby allow balls from said tube to pass into said ball inlet.

3. The combination of claim 1 wherein said toroidal passageway has an outer diameter essentially described by the outer periphery of said cut-out in said rotatable member, with said toroidal passageway being coextensive with said rotatable member for less than 360°, whereby; balls may be transferred from said reservoir into the flowline to thereby flow into the well to seal off holes in the surface of the wall that forms the well.

4. The combination of claim 1, and further including means for counting each ball that passes through said passageway;

said means comprising a feeler finger, a shaft means, and a lever means, with said feeler finger and said lever means being spaced apart on said shaft means;

said feeler finger being located inside said passageway where it will be actuated by a ball;

and said lever means being located externally of said main body; whereby:

a ball passing through said passageway will actuate said feeler finger and cause movement of said lever means.

5. In a ball sealer injector device for positively transferring balls into a well, a flowline having an inlet adapted to be connected to a source of flow and an outlet adapted to be connected to a well, the improvement comprising:

a main body having a passageway, a ball inlet, and a ball outlet, with said passageway interconnecting said ball inlet to said ball outlet;

a ball containing reservoir having means for aligning a multiplicity of balls with said ball inlet and including means for urging the balls into said ball inlet;

means for transferring balls from said ball inlet, through said passageway, to said ball outlet, and into the flowline;

means for counting each ball that passes through said passageway;

said counting means comprising a feeler finger, a shaft, and a lever means, with said feeler finger and said lever means being spaced apart on said shaft;

said feeler finger being located inside said passageway where it will be actuated by the ball;

and said lever means being located externally of said main body, whereby a ball passing through said passageway will actuate said feeler finger and cause movement of said lever means.

6. The combination of claim 5 wherein said ball containing reservoir includes a depending container having a multiplicity of longitudinally arranged tubes radially spaced about a rotatable means with each tube being attached to said rotatable means to thereby be superimposed along a circumferential path with said circumferential path passing along said ball inlet to thereby allow said tubes to be selectively superimposed above and in alignment with said ball inlet, whereby: said tubes may be selectively aligned with said ball inlet to thereby allow balls from said tube to pass into said ball inlet.

7. The combination of claim 5 wherein said means for transferring balls includes a rotatable member having means forming cut-outs therein for receiving a ball from said ball inlet;

a toroidal passageway having an outer diameter essentially described by the outer periphery of said cut-out in said rotatable member, with said toroidal passageway being coextensive with said rotatable member for a limited circumferential distance, whereby; a ball may be transferred from said reservoir, through said inlet, whereupon the ball enters said cut-out and is rotatably transferred to the flowline to thereby flow into the well to seal off holes that may be present in the surface of the wall of the well.

8. In a ball sealer injector device for positively metering balls and the like into a well, a flowline having an inlet adapted to be connected to a source of flow and an outlet adapted to be connected to a well, the improvement comprising:

a main body having a passageway, a ball inlet, and a ball outlet, with said passageway interconnecting said ball inlet to said ball outlet;

a ball containing reservoir having a multiplicity of balls aligned with said ball inlet and including means for urging the balls into said ball inlet;

means for transferring balls from said ball inlet, through said passageway, to said ball outlet, and into the flowline;

said ball containing reservoir including a depending container having a multiplicity of longitudinally arranged tubes radially spaced about a rotatable means with each tube being attached to said rotatable means to thereby be superimposed along a circumferential path with said circumferential path passing along said ball inlet to thereby allow said tubes to be selectively superimposed above and in alignment with said ball inlet, whereby;

said tubes may be selectively aligned with said ball inlet to thereby allow a ball from one of said tubes to be transferred from said reservoir into the flowline to thereby flow into the well to seal off holes in the surface of a wall located within the well.

9. The combination of claim 8 wherein said means for transferring balls includes a rotatable member having ball receiving means therein for receiving a ball from said ball inlet;

said passageway including a toroidal passageway having an outer diameter essentially described by the outer periphery of said ball receiving means of said rotatable member, with said toroidal passageway being coextensive with said rotatable member for a limited circumferential distance, whereby; balls may be transferred from said reservoir into the flowline to thereby flow into the well to seal off holes in the surface of a wall associated with the well.

10. The combination of claim 8 wherein said means for transferring the ball into said ball inlet includes a plunger, a spring, and a lock, with said plunger being resiliently biased toward said ball inlet by said spring which is located in compressed relationship between said plunger and said lock, and with said lock being removably attached to an upper depending end of said tube.

11. The combination of claim 9 and further including means for counting each ball that passes through said passageway;

said means comprising a feeler finger, a shaft, and a lever means, with said feeler finger and said lever means being spaced apart on said shaft;

said feeler finger being disposed within said passageway where it will be actuated by the ball;

and said lever means being disposed externally of said main body; whereby: a ball passing through said passageway will actuate said feeler finger and cause movement of said lever means.

12. The combination of claim 11, and further including means for measuring flow through the flow line, means for controllably actuating said rotatable means of said ball containing reservoir, means for controllably actuating said rotatable means, and means responsive to said counter to actuate said injector in a manner to place a predetermined number of balls into the flowline in proportion to the flow of liquid therethrough.

References Cited

UNITED STATES PATENTS

| | | | |
|---|---|---|---|
| 3,039,531 | 6/1962 | Scott | 15—104.06 |
| 3,081,472 | 3/1963 | Van Dijk | 137—268 XR |

M. CARY NELSON, *Primary Examiner.*

R. J. MILLER, *Assistant Examiner.*